United States Patent
Agrawal et al.

(10) Patent No.: US 8,346,674 B2
(45) Date of Patent: Jan. 1, 2013

(54) INTELLIGENT PHYSICAL MAIL HANDLING SYSTEM

(75) Inventors: Kavita Agrawal, Austin, TX (US); William K. Bodin, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1211 days.

(21) Appl. No.: 11/554,391

(22) Filed: Oct. 30, 2006

(65) Prior Publication Data

US 2008/0104179 A1    May 1, 2008

(51) Int. Cl.
   *G06Q 30/00*    (2012.01)
   *G06Q 10/00*    (2012.01)
   *G06F 17/00*    (2006.01)
   *G06F 7/00*    (2006.01)

(52) U.S. Cl. ............ 705/330; 705/1.1; 705/401; 700/90; 700/224

(58) Field of Classification Search .................... 705/1.1, 705/330, 401; 700/90, 224
See application file for complete search history.

(56) References Cited

U.S. PATENT DOCUMENTS

| | | | |
|---|---|---|---|
| 6,400,810 B1 | 6/2002 | Skladman et al. | |
| 6,508,365 B1 | 1/2003 | Cacace-Bailey et al. | |
| 6,892,939 B2* | 5/2005 | Silver et al. | 235/375 |
| 7,346,591 B2* | 3/2008 | Sansone | 705/410 |
| 7,543,735 B2* | 6/2009 | Silver et al. | 235/375 |
| 7,640,305 B1 | 12/2009 | Arthur et al. | |
| 7,769,485 B2* | 8/2010 | Miller et al. | 700/224 |
| 7,778,880 B2* | 8/2010 | Seeley | 705/26.35 |
| 2002/0165729 A1* | 11/2002 | Kuebert et al. | 705/1 |
| 2002/0169519 A1* | 11/2002 | Ferrara et al. | 700/224 |
| 2002/0169835 A1 | 11/2002 | Paul | |
| 2004/0019646 A1 | 1/2004 | Zweben et al. | |
| 2004/0059625 A1 | 3/2004 | Schrader | |
| 2004/0103051 A1 | 5/2004 | Reed et al. | |
| 2004/0117326 A1* | 6/2004 | Amato | 705/401 |
| 2004/0176072 A1* | 9/2004 | Gellens | 455/412.1 |
| 2005/0010477 A1 | 1/2005 | Sullivan | |
| 2005/0060643 A1 | 3/2005 | Glass et al. | |
| 2005/0127157 A1 | 6/2005 | Stemmle et al. | |
| 2005/0138660 A1 | 6/2005 | Boyer et al. | |
| 2005/0273405 A1 | 12/2005 | Chen | |
| 2006/0122858 A1* | 6/2006 | Miles et al. | 705/1 |

(Continued)

FOREIGN PATENT DOCUMENTS

JP    10164127    6/1998

(Continued)

OTHER PUBLICATIONS www.ecofuture.org/jmusps.html.*

(Continued)

*Primary Examiner* — Fadey Jabr
(74) *Attorney, Agent, or Firm* — Robert H. Frantz; John D. Flynn

(57) ABSTRACT

A system and method for handling unwanted physical mail pieces having a sorter and imager which intercepts one or more pieces of physical mail, which produces an electronic image of a front panel of each piece of mail, and which physically retains pieces of mail in temporary physical storage, and which cooperates with an optical recognizer to determine an intended recipient for each retained piece of mail, further cooperating with a server that notifies the intended recipients and receives a choice for disposition of the mail, and including a destruction which destroys said pieces of mail rejected by the intended recipient.

6 Claims, 16 Drawing Sheets

U.S. PATENT DOCUMENTS

| | | | |
|---|---|---|---|
| 2006/0143140 A1* | 6/2006 | Stemmle et al. | 705/401 |
| 2006/0155567 A1 | 7/2006 | Walker | |
| 2006/0167834 A1* | 7/2006 | Rubel | 707/1 |
| 2006/0190107 A1* | 8/2006 | Kassar et al. | 700/90 |
| 2006/0219601 A1* | 10/2006 | Babanats et al. | 209/3.3 |
| 2006/0253405 A1* | 11/2006 | Nirenberg | 705/401 |
| 2007/0038718 A1* | 2/2007 | Khoo et al. | 709/206 |
| 2007/0118385 A1* | 5/2007 | Silverstein | 705/1 |
| 2007/0156423 A1* | 7/2007 | Foth et al. | 705/1 |
| 2008/0040242 A1* | 2/2008 | Chang et al. | 705/28 |
| 2009/0164662 A1 | 6/2009 | Mather | |
| 2010/0042694 A1 | 2/2010 | Mittelstaedt et al. | |
| 2010/0211456 A1 | 8/2010 | Reed et al. | |
| 2011/0170136 A1* | 7/2011 | Zakarian et al. | 358/1.15 |

FOREIGN PATENT DOCUMENTS

| | | |
|---|---|---|
| JP | 2003229910 A | 8/2003 |

OTHER PUBLICATIONS

Direct Marketing Assoc.; "Getting off mailing lists / Mail Preference Service"; downloaded on Sep. 28, 2006 from http://www.dmaconsumers.org/cgi/offmailinglist.

Direct Marketing Assoc., "Getting off mailing lists/Mail Preference Service", downloaded on Sep. 28, 2006 from http://www.dmaconsumers.org/cgi/offmailinglist.

Scott E. Hudson; Electronic Mail Previews Using Non-Speech Audio; 1996;ACM; 0-89791;237-238.

Robert J. Hall; How to Avoid Unwanted Email;1998;41;88-95.

Agrawal, K.; reply to non-final third office action in related U.S. Appl. No. 11/554,353, filed Oct. 30, 2006 by Kavita Agrawal.

USPTO; recent office action mailed on Aug. 19, 2011 in related U.S. Appl. No. 11/554,353, filed Oct. 30, 2006 by Kavita Agrawal.

Agrawal; reply brief in the appeal of related U.S. Appl. No. 11/554,353, filed Oct. 30, 2006.

USPTO; final rejections mailed on Dec. 5, 2011 in related U.S. Appl. No. 11/554,353, filed Oct. 30, 2006 by Kavita Agrawal.

Agrawal; Notice of Appeal filed to the USPTO on Feb. 6, 2012 in related U.S. Appl. No. 11/554,353.

Agrawal, K.; appeal brief recently filed in related U.S. Appl. No. 11/554,353, filed Oct. 30, 2006 by Kavita Agrawal, et al.

Agrawal, K.; Examiner's Answer in the appeal of related U.S. Appl. No. 11/554,353, filed Oct. 30, 2006 by Kavita Agrawal, et al.

* cited by examiner

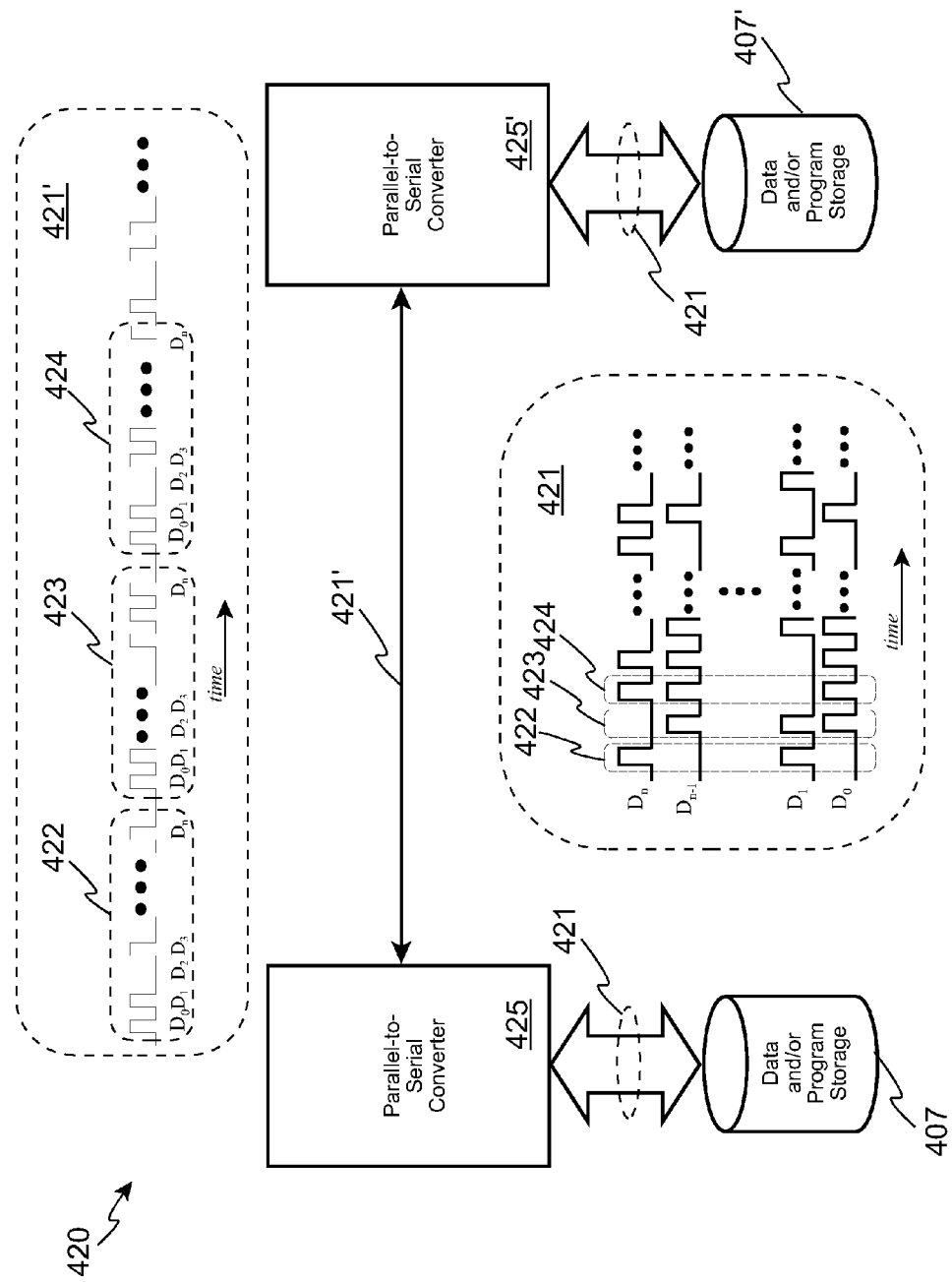

INTELLIGENT PHYSICAL MAIL HANDLING SYSTEM

BACKGROUND OF THE INVENTION

1. Field of the Invention

This invention pertains to technologies employed to handle physical mail such as paper envelopes, parcels, catalogs, fliers, leaflets, and packages.

2. Background of the Invention

Paper junk mail or snail-mail sent out each year is rising at an alarming rate. Most of this mail is sent unsolicited, such that it is unknown whether the recipients wish to receive it or not. Some schemes, such as coupon methods, allow the senders or sponsors of the junk mail to determine the effectiveness of the mail campaigns by tracking the number of coupons redeemed.

However, it is estimated that over half of this mail is never even opened by the recipients, amounting to approximately 4 million tons of wasted materials, not including wasted resources such as fuel to deliver the mail and fuel to remove the discarded mail.

In a first problem with the status quo, this junk mail often contains personal information such as the recipients' names and addresses. Many recipients have purchased paper shredders in order to destroy unwanted mail before discarding it.

In a second problem with the status quo, recycling costs are generally considered to be high for such materials.

One attempt to solve or reduce this problem is a service currently provided by the Direct Marketing Association ("DMA") through their "Mail Preference Service" ("MPS"). In this scheme, consumers, but not businesses, can register for a nominal fee, which places their name and address in a "do not mail" database. Members of the DMA are required by the rules of membership to delete these addressees from their mailing lists. Additionally, if an unwanted piece of mail is received by a subscriber to the service, the subscriber can forward it, at the cost of forwarding postage plus a small handling fee, to have it processed by the DMA, presumably to notify the sender to remove the addressee from their mailing list. This scheme does not reduce mail from non-DMA members, as membership is voluntary, and it is costly to the consumer. Further, it is not applicable to businesses.

Therefore, there is a growing need to handle unwanted physical mail more efficiently and cost effectively for consumers and businesses.

SUMMARY OF THE INVENTION

This invention provides a low cost, user friendly, labor saving seamless method for identifying and stopping junk mail being delivered, thereby saving the postal department time and energy to delivering such high volume of junk mails, and also providing the users a hassle free method to sort through this mail.

This invention makes use of a webportal where images of mail received by the user are uploaded, the user then identifies the mail they would like to receive or not by identifying that mail as trash or putting it in a spam list. This portal is connected to a scanner at the postal department from where these images are received. After user selection has been made, the webservice then downloads the information into a database connected to a scanner and a shredder which then act in accordance to user preference.

According to another aspect of the present invention, the system "learns" which senders are to be blocked, and can automatically disposition or dispose of future mail without requiring the addressee's interaction.

According to another aspect of the present invention, the system can provide notifications of pending and held mail to the intended recipient via a number of interface processes, including but not limited to an interactive web page, text messages, text paging, electronic mail ("email"), facsimile ("fax"), and interactive television ("iTV").

According to another aspect of the present invention, the system accumulates statistics for individuals or groups of individuals regarding their acceptance and rejection rates, sorts and processes the information according to specific senders, according to specific sender industries, etc., and provides this statistical information to interested parties, such as direct marketing companies, for their use in analyzing and improving the effectiveness of their campaigns, including but not limited to removing recipients from their own mailing lists who reject their mailings regularly.

According to yet another aspect of the present invention, direct marketing advertisers and bulk mail generators are enabled to load mail image and data directly into the system's databases prior to actually producing or posting the physical mail pieces. The intended recipients may review the mail, and reject or accept it. Accepted mail is then produced and posted, thereby avoiding production and postage of unwanted mail.

According to still another aspect of the present invention, mail received by a recipient at their home or office is physically discarded into a collection bin. Contents of this bin are periodically collected, and returned to a processing center where it is scanned, and the data is extracted regarding which sender's sent rejected mail, and which recipients rejected mail. This data is then processed similarly to provide the senders with useful information about which recipients are discarding their mail so that their campaigns can be further refined.

In other aspects of the present invention, businesses processes are provided which allow for reduction of costs by bulk mail producers and senders, and which allow for revenue generation by operators of the invention through selling of the aggregated and processed rejection/acceptance information.

BRIEF DESCRIPTION OF THE DRAWINGS

The following detailed description when taken in conjunction with the figures presented herein provide a complete disclosure of the invention.

FIGS. 4a, 4b and 4c, illustrate computer readable media of various removable and fixed types, signal transceivers, and parallel-to-serial-to-parallel signal circuits.

DETAILED DESCRIPTION OF THE INVENTION

The inventors of the present invention have recognized a problem unaddressed in the art regarding the inability of bulk mail producers, postal agencies, and mail customers to control costs, minimize waste, and reduce frustration by avoiding the sending, delivery, or both, of unwanted physical (e.g. "real") mail, leaflets, fliers, letters, catalogs, and parcels. The inventors have realized that processes which depend on returning of unwanted mail, especially those which incur a fee, further exasperate the problem by adding cost, labor, and transportation resource consumption, as well as increasing frustration instead of reducing it.

System Overview

Figure 1:
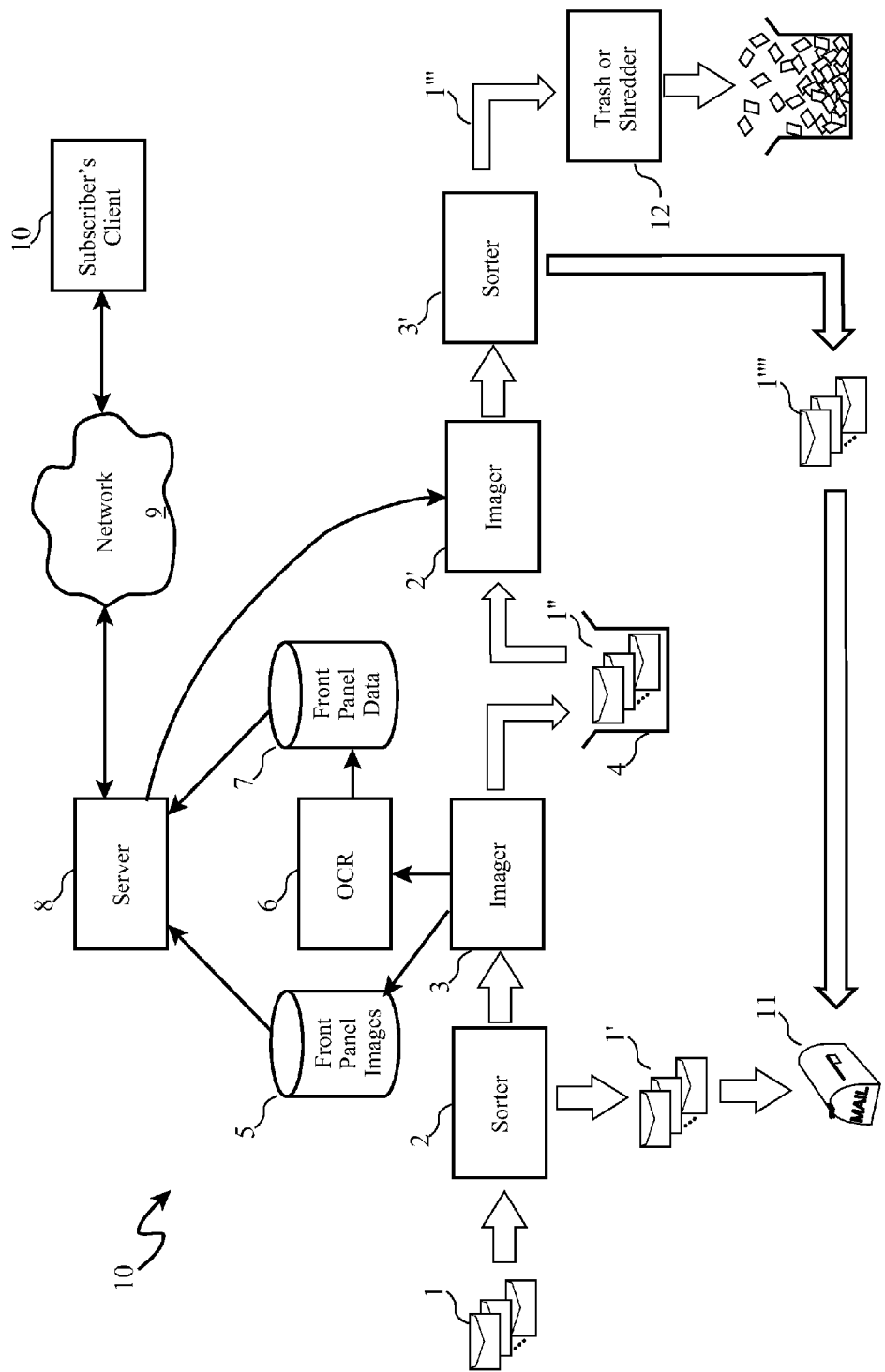
FIG. 1 depicts a interactions between systems components according to the present invention.

Turning to FIG. 1, and overview of a system according to the invention is shown. Some components of this system may already exist in some postal handling centers, such as mail sorting and scanning (e.g. imaging) systems, but they are integrated according to the invention in a different manner from their present use.

Unsorted physical mail pieces (1) are received by the handling center, such as a post office, from a bulk mail sender or direct marketing advertiser. These types of pieces of "bulk" mail are typically identical in size, appearance, and shape, except that they usually have different addressees indicated on their front panel. The addressee indications are often made using adhesive labels which have been computer printed and machine applied to the pieces of mail. Some bulk mail, however, such as catalogs and certain advertisement fliers, have computer-controlled addressee information printed directly only them, without the need for a label. These pieces are sometimes "presorted" by bundling them according to like destinations, such as by ZIP Code™, which sometimes entitles the sender to a reduced postage rate. The pieces are received by the post office or processing center often in large tubs, bins or boxes.

They are loaded into a sorter (2), which quickly scans and images them using an imager (3). Addressee information is recognized using Optical Character Recognition ("OCR") (6). According to the invention, instead of temporarily using this OCR information for routing of the letter to bins headed for the destination post office, this information is then saved in image form (5) and preferably data form (7), such as text in a database.

Next, instead of routing the mail normally for delivery (1') to the recipient's physical mail box (11), mail (1") which is addressed to subscribers of the special bulk mail blocking service ("Bulk Blocker") is routed to temporary physical storage (4), either at the destination post office, at the origin post office, or at a storage facility intermediate to the origin and destination.

A bulk blocker server (8) then makes these images and data regarding held mail available to the intended recipient's client system (10), such as the subscriber's web browser, personal digital assistant ("PDA"), cell phone, interactive television, facsimile machine, etc., through a network (9), such as the Internet, an intranet, a telephone network, a wireless network, etc.

Using the client system (10), the intended recipient reviews the images of the mail, the data from the front panels, or both, and indicates which pieces of mail to forward, and which pieces to destroy. Optionally, the recipient may configure preferences, and system may optionally adjust or otherwise "learn" recipient preferences, for automatic handling or classification of held mail.

The server (8) receives these choices from the client system (10), and uses these choices to generate commands to cause the unwanted mail (1''') to be discarded or destroyed (12). To accomplish this, one embodiment of the invention utilizes an imager (2') and sorter to find the unwanted mail in the temporary physical storage (4), and to route the found unwanted mail to a trash container or shredding system.

The remaining, wanted mail (1'''') is then forwarded to the recipient's physical mail box (11).

Figure 5:
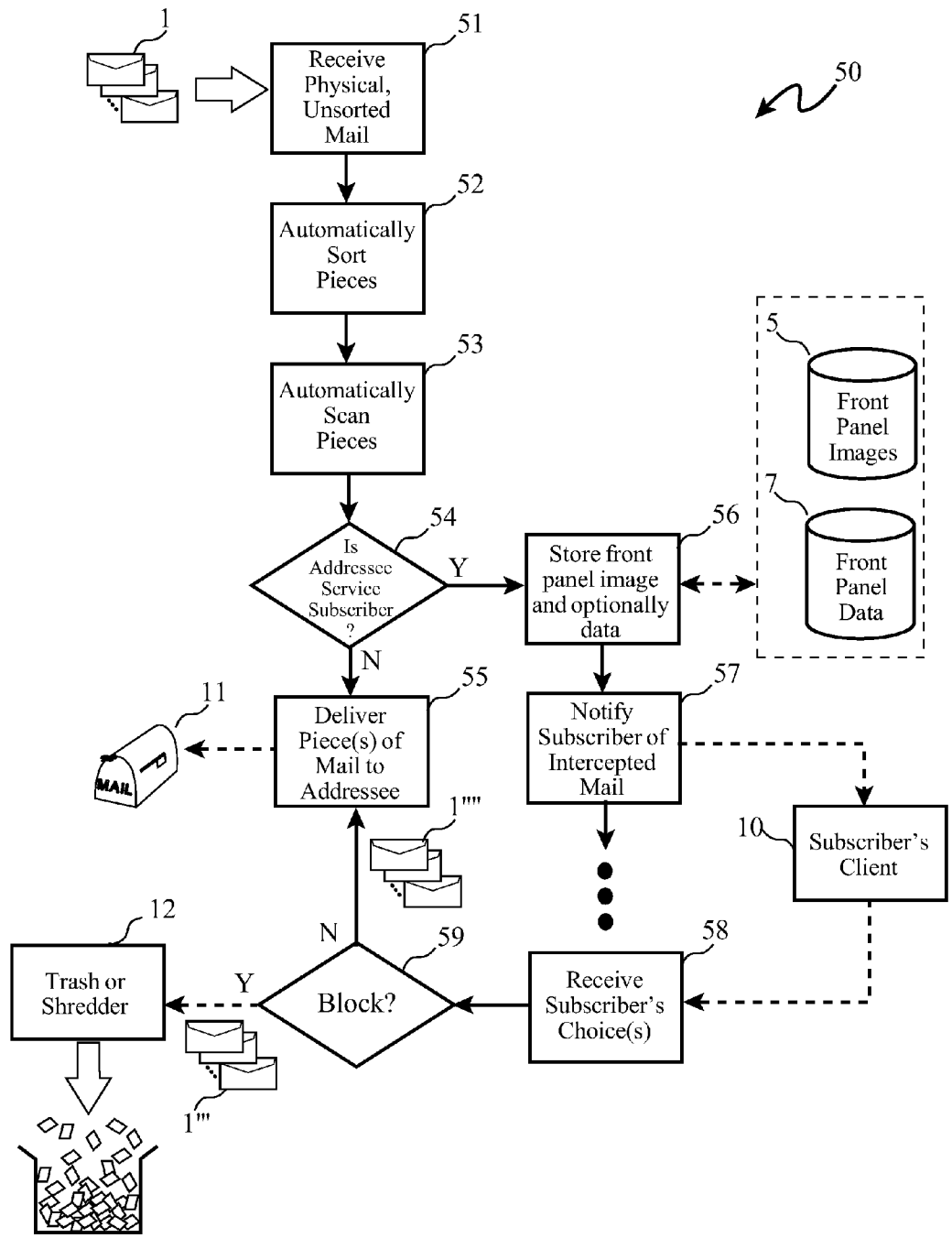
FIG. 5 provides a logical process according to the invention for receiving and handling physical mail.

Turning to FIG. 5, a general logical process (50) according to the invention is shown for handling mail as described in conjunction with FIG. 1. The physical mail is received (51), automatically sorted (52), and automatically scanned (53) to yield front panel images and information regarding the sender and the addressee. If the addressee is a subscriber to the bulk blocker service (54), processing continues, otherwise, the mail piece is automatically routed to the recipient normally (55).

For mail which is to be handled by the invention, the front panel image and preferably optically recognized information is stored (56), and the subscriber is notified of pending, held mail (57). After the subscriber has selected a disposition option for the mail (58), such as discarding, returning, or forwarding, the system then destroys the piece of mail (59, 500) or forwards it (55) to the recipient as appropriate.

Subscriber Interface Systems and Methods

Figure 6:
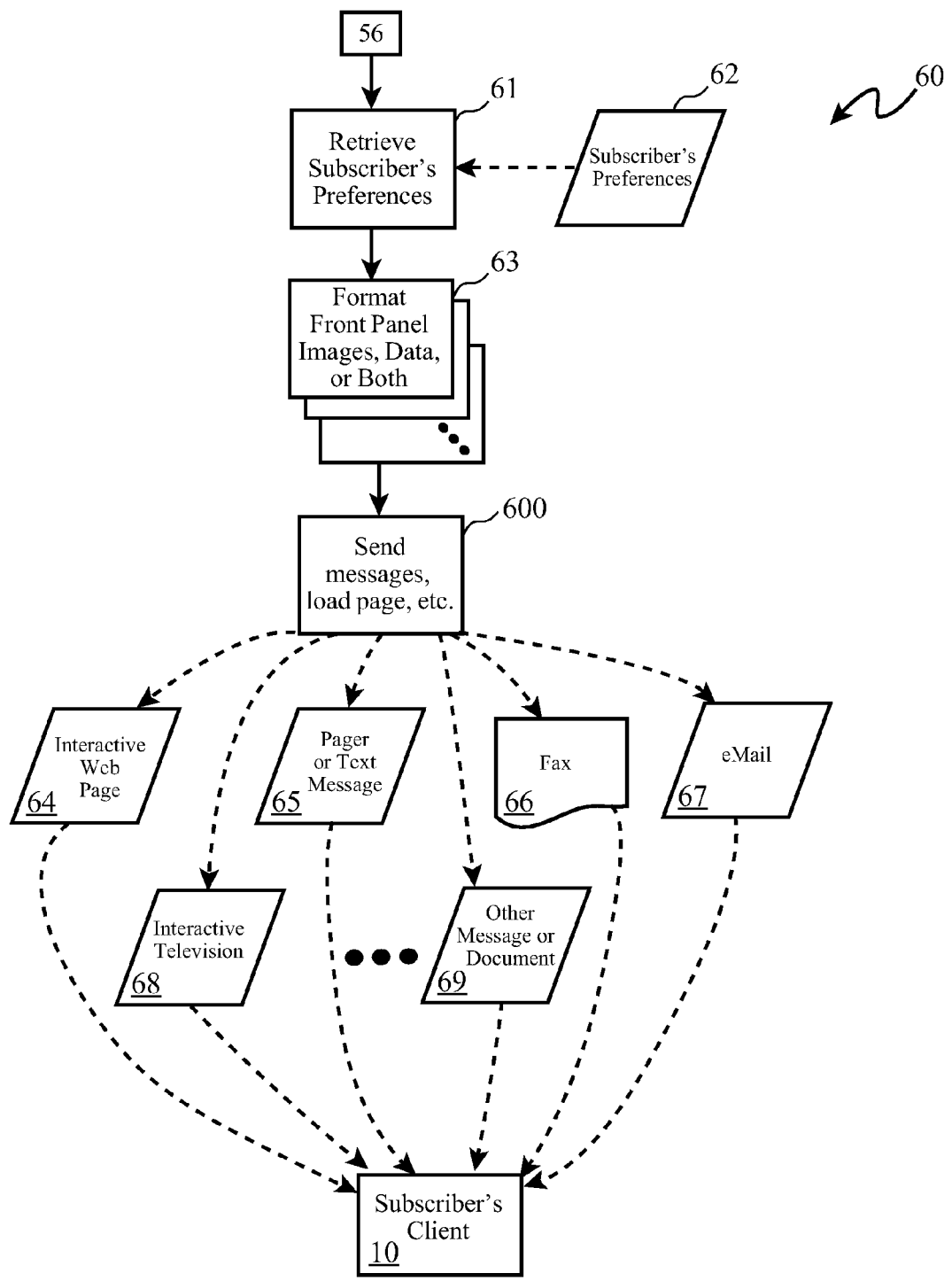
FIG. 6 sets forth a logical process according to the invention for notifying a service subscriber of pending mail being held for disposition.

According to another aspect of the invention, the subscriber of the bulk block service may be notified in one or more ways of pending, held mail. Turning to FIG. 6, several methods of such notification are illustrated (60), including retrieving a set of preferences for the subscriber to determine which notification methods to use, and then formatting the front panel images, data, or both, to produce an appropriate notification medium or media.

In one option, the subscriber may log into a web portal through the server, for example, and review lists and images of pending held mail using an interactive web page (64). In another optional embodiment, the subscriber may receive (600) a pager message, Short Message Service ("SMS"), or instant messenger ("IM") message containing a text description of the invention, and optionally an image of the piece of mail or a link to an image. Such a text message may appear in one embodiment as follows:

---

Message from BulkBlock RealMail Service:
A letter weighing 1.5 oz from Credit Card Merchant Bank is being -continued held for you by the USPS. How do you want it handled?
(A) forward it    (B) Trash it    (C) Return to sender Similarly, a fax message (66) can be sent (600) to the subscriber's fax machine, an email can be sent, or a screen can be displayed on an interactive television (68). Other notifications (69), such as an outbound automated telephone call to a home, office, or mobile telephone placed by an Interactive Voice Response ("IVR") system may be made, as well.

The subscriber's choice may be indicated back to the server using any suitable return messaging methods, such as a return text message, return email, web page button, a returned fax page, a returned pager message, etc. In many embodiments, the choice submission method will be symmetrical with the notification method, but this is not required by the invention. For example, the notification can be made by one or more methods, such as a pager message and an email, but the choice can be received via an interactive web page. Additionally, the subscriber's choice may be received relatively soon after the notification is sent, or it may be received at a considerable delay from the time of the notification.

In the latter case where the subscriber's choice is not received for some lengthy amount of time, the system may be optionally configured to forward stored and held mail without further approval by the subscriber. In this manner, mail which has been held for a maximum allowable time can be automatically routed to the subscriber, thereby reducing and managing the physical storage requirements of the service provider.

Services to Bulk Mailers

Figure 7:
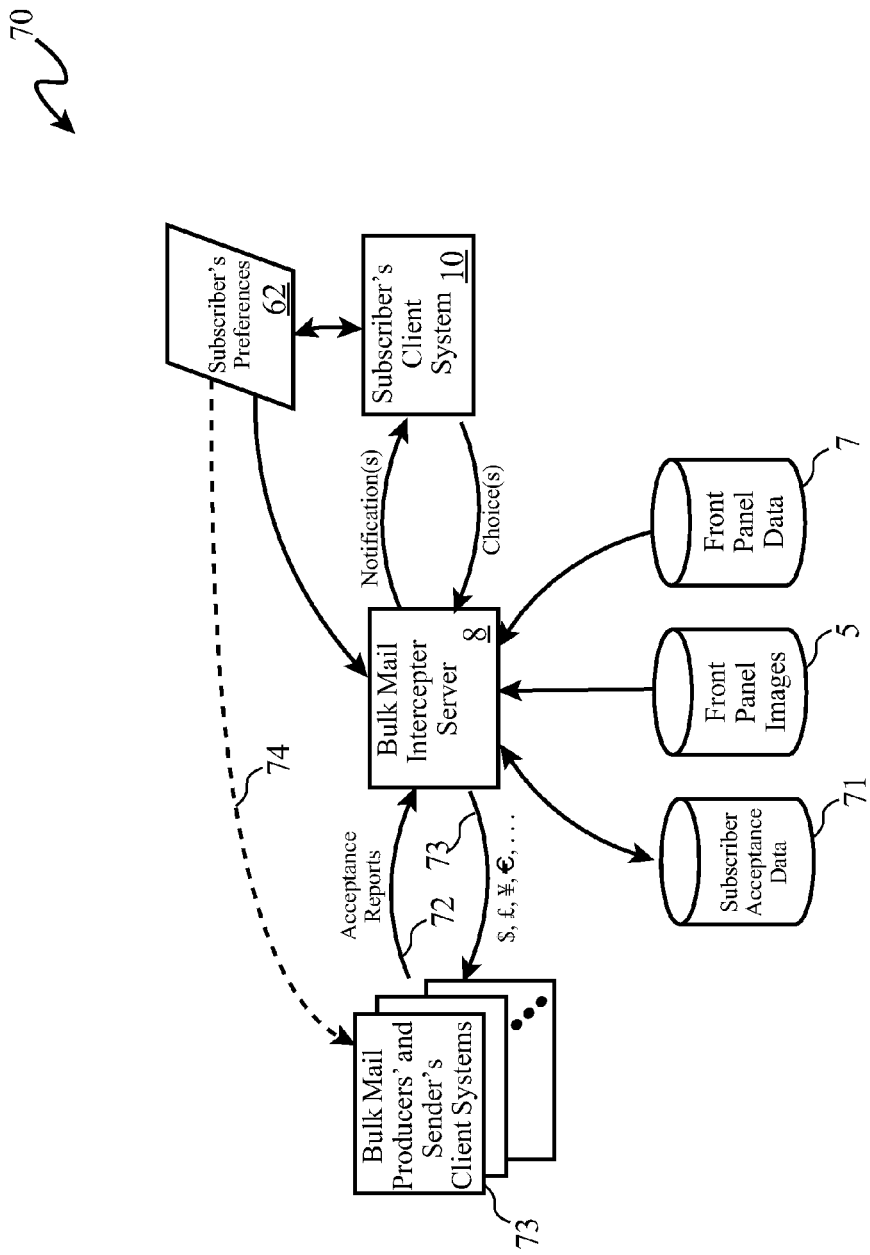
FIG. 7 illustrates methods and interactions of system components according to the invention for forwarding aggregated and processed acceptance and rejection information to direct marketing enterprises.

Turning to FIG. 7, an available embodiment (70) of the invention which provides "feedback" services to the senders of unwanted mail is shown. In this arrangement, the server is further configured to collect choices from subscribers, and to aggregate and process that acceptance data (71) to yield information which would be useful for the senders to further refine their marketing and mailing strategies.

For example, data can be aggregated by targeted subscriber to indicate a specific subscriber's likelihood of accepting unsolicited mail, such as showing:

Bulk Mail Advice for:
Mr. Richard A. Smith
101 Main Street, Anytown, Tex. 75999 USA
General Acceptance Rate: 23%

This likelihood of acceptance can be further broken down by correlating sender industry segment with acceptance and rejection rate:

| Bulk Mail Advice for: | |
|---|---|
| Mr. Richard A. Smith | |
| 101 Main Street, Anytown, TX 75999 USA | |
| General Acceptance Rate: | 23% |
|    From credit card issuers: | 1% |
|    From travel industry: | 60% |
|    From home products retailers | 4% |
|    From political sources: | 0% |
|    ... | |
|    From charities: | 44% |

The information can also be aggregated and processed by group of recipients, such as by demographic groups. For example, the data for recipients in a certain ZIP code™, or having suite or apartment numbers, or having male names, etc., can be combined reported. Such an example is:

| Bulk Mail Advice for: | |
|---|---|
| RECIPIENTS IN POSTAL CODE 75999 | |
| General Acceptance Rate: | 37% |
|    From credit card issuers: | 28% |
|    From travel industry: | 8% |
|    From home products retailers: | 45% |
|    From political sources: | 32% |
|    ... | |
|    From charities: | 41% |

This information (72) can be formatted into human-readable form, such as a print out or report, as machine-readable format, such as comma-separate variable ("CSV"), text computer files, or Electronic Data Interchange ("EDI") messages, or both.

The information can be sent to client systems (73) of the bulk mailers for further processing, such as updating mailing lists, refining marketing messages, etc.

Revenue Generation Process through Acceptance Reports

According to another aspect of the present invention, not only are costs reduced through the avoidance of producing, mailing, and transporting unwanted mail, but the aggregated intelligence can be sold to third parties, including but not limited to bulk mailers, to generate revenue (73) as shown in FIG. 7. In this business process embodiment of the invention, the users' preferences (74) may also be combined with the acceptance reports (72) as part of the intelligence product.

A business process according to the present invention includes, at least in one embodiment:

(a) establishing a commercial agreement between a service provider and a recipient to provide a bulk mail blocking service;

(b) establishing a commercial agreement between said service provider and a bulk mail sender to report acceptance information regarding sender's mail blocked or accepted by said recipient;

(c) physically intercepting mail in route to a recipient as described herein; and (d) reporting to said sender acceptance intelligence about acceptance by said recipient of said intercepted mail.

A alternative business method according to the invention which provides group or demographic-based reporting includes, in at least one embodiment:

(a) establishing a commercial agreement between a service provider and a group of recipients to provide a bulk mail blocking service;

(b) establishing a commercial agreement between said service provider and a bulk mail sender to report acceptance information regarding sender's mail blocked or accepted by said recipients;

(c) physically intercepting mail in route to a recipient as described herein;

(d) aggregating and processing information regarding acceptance of said intercepted mail by said recipients as a group; and (d) reporting to said sender acceptance intelligence about said recipient group.

Mail Production Modulation

Figure 8:
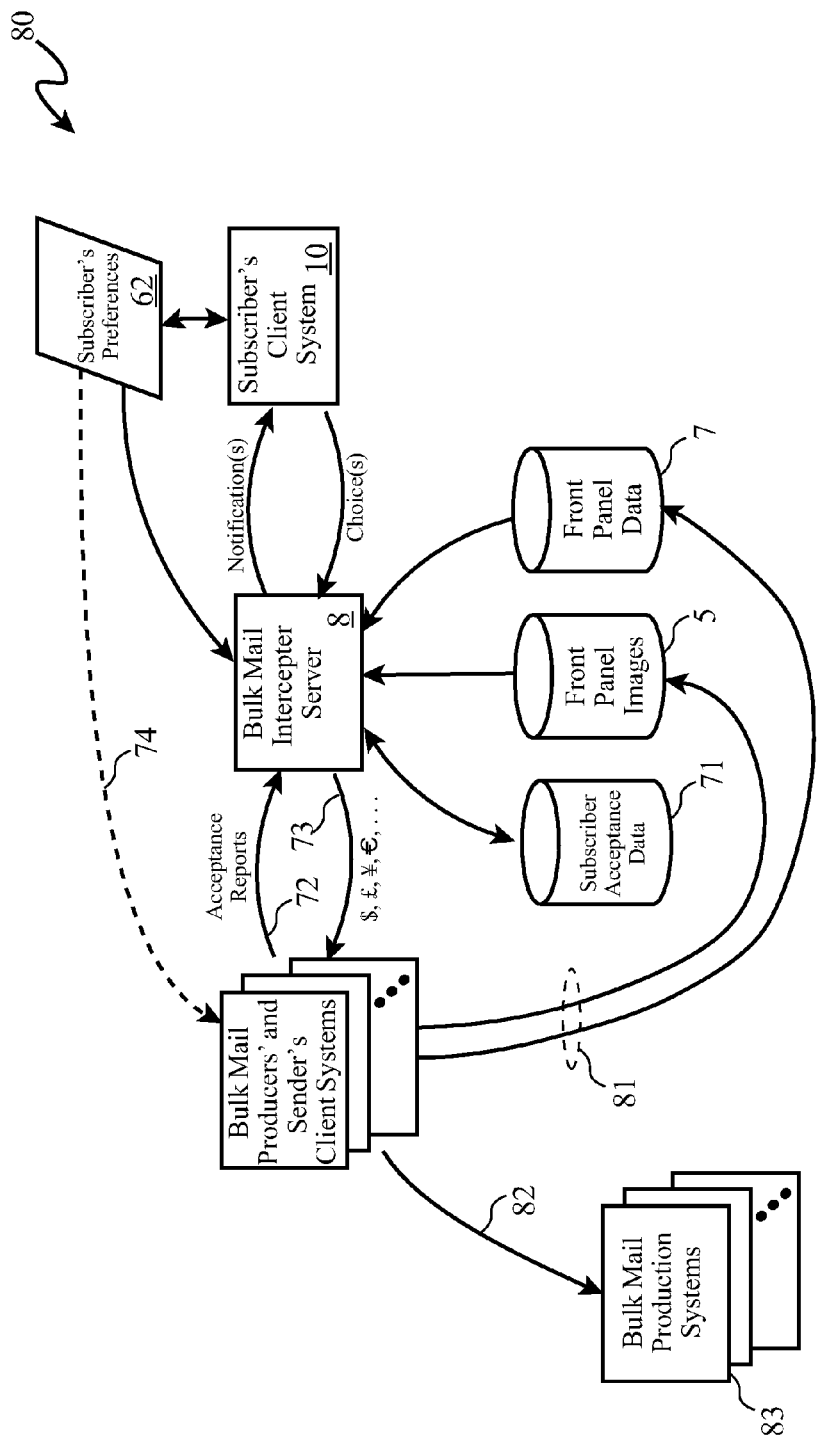
FIG. 8 shows an embodiment variation of the depiction of FIG. 7 in which mail production systems are further controlled by the invention.
Figure 9:
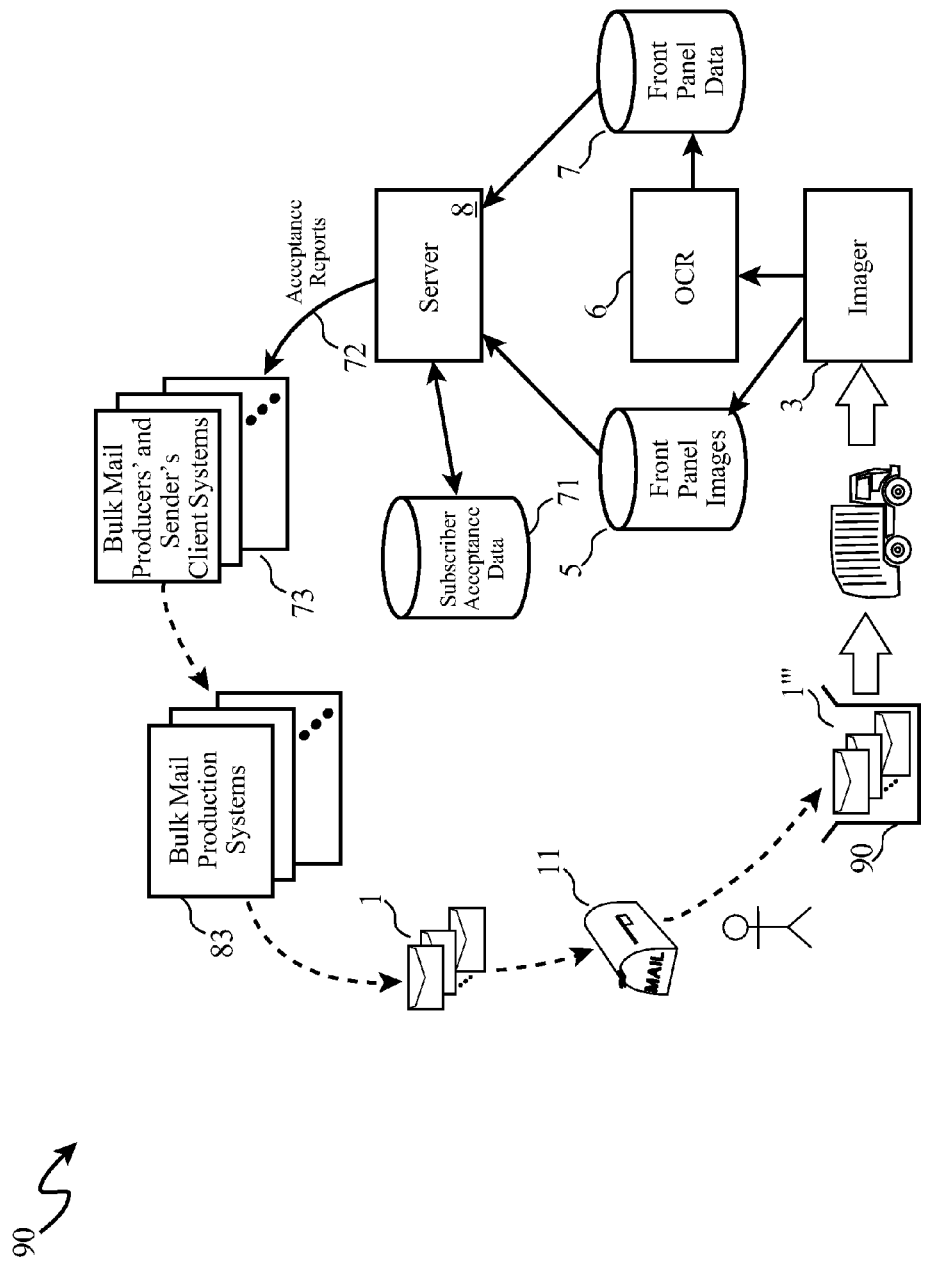
FIG. 9 illustrates an alternative embodiment of the invention which allows for collection of discarded mail from recipients, and processing of the mail to mine rejection information, for further use as shown in the other figures.

Turning to FIG. 8, the system and interactions of FIG. 7 is further refined to modulate (82) a mail production system (83). This system (80) allows the bulk mail senders to provide front panel images, front panel data, or both (81) directly into the front panel images database (5) and front panel data database (7) before the mail pieces are sent, and optionally even before they are produced.

In this manner, the system operates as discussed in the foregoing paragraphs to notify the subscriber of pending mail, albeit "virtual" mail which has not be intercepted by the invention yet. The intended recipients can then accept or reject the mail in a similar fashion as they can accept or reject actual mail.

In this configuration (80), however, the acceptance reports (72) sent to the bulk mailers, who can then make decisions on whether or not to mail or even produce the pieces of mail.

If the unaddressed mail pieces have already been produced, addressing and mailing of pieces to the rejecting addressees can be avoided, thereby saving postage on those pieces. The mail production systems are instructed (82) not to print labels or mail pieces addressed to the subscribers who rejected the virtual mail. In this step, a first level of cost savings are realized.

Further, as a mailing campaign, if the overall success or acceptance rate of a particular piece of mail does not receive a predetermined level of acceptance, the entire mailing campaign can be canceled. If the mail pieces have not been produced, then the entire cost of postage and production can be avoided, otherwise, at least the cost of postage can be reduced.

In this latter example, bulk mailers are enabled by the invention to test market virtual mailing campaigns without actually committing to production and mailing of the pieces. If a campaign does not meet a targeted success rate, then it can be modified, and re-attempted (e.g. virtual mail pieces, images and data, can be loaded into the databases 5 and 7). This can be iterated until the message and format of the mailing has been optimized for success, concluding with an actual production cycle of mail pieces and posting them to the addressees.

To these ends, the aforementioned business processes may also be enhanced and refined to take advantage of these system provisions.

Post-Receipt Processing Embodiments

In another embodiment of the invention, physical mail (1) is delivered to the intended recipients' mailboxes (11). The recipients then manually sort through the mail pieces, discarding the pieces which they regard as junk or unwanted into a collection bin (90). Periodically, or on-demand, the mail pieces are collected (91) and transported to an imaging (3) station, where they are imaged and input into the front panel databases (5, 7), and further processed as previously discussed.

As an addendum to the aforementioned business processes, revenue may be generated through charging a fee to the subscribers for the collection and processing of the unwanted mail, in return for the removal of the mail and for the reduction of unwanted mail.

Figure 10:
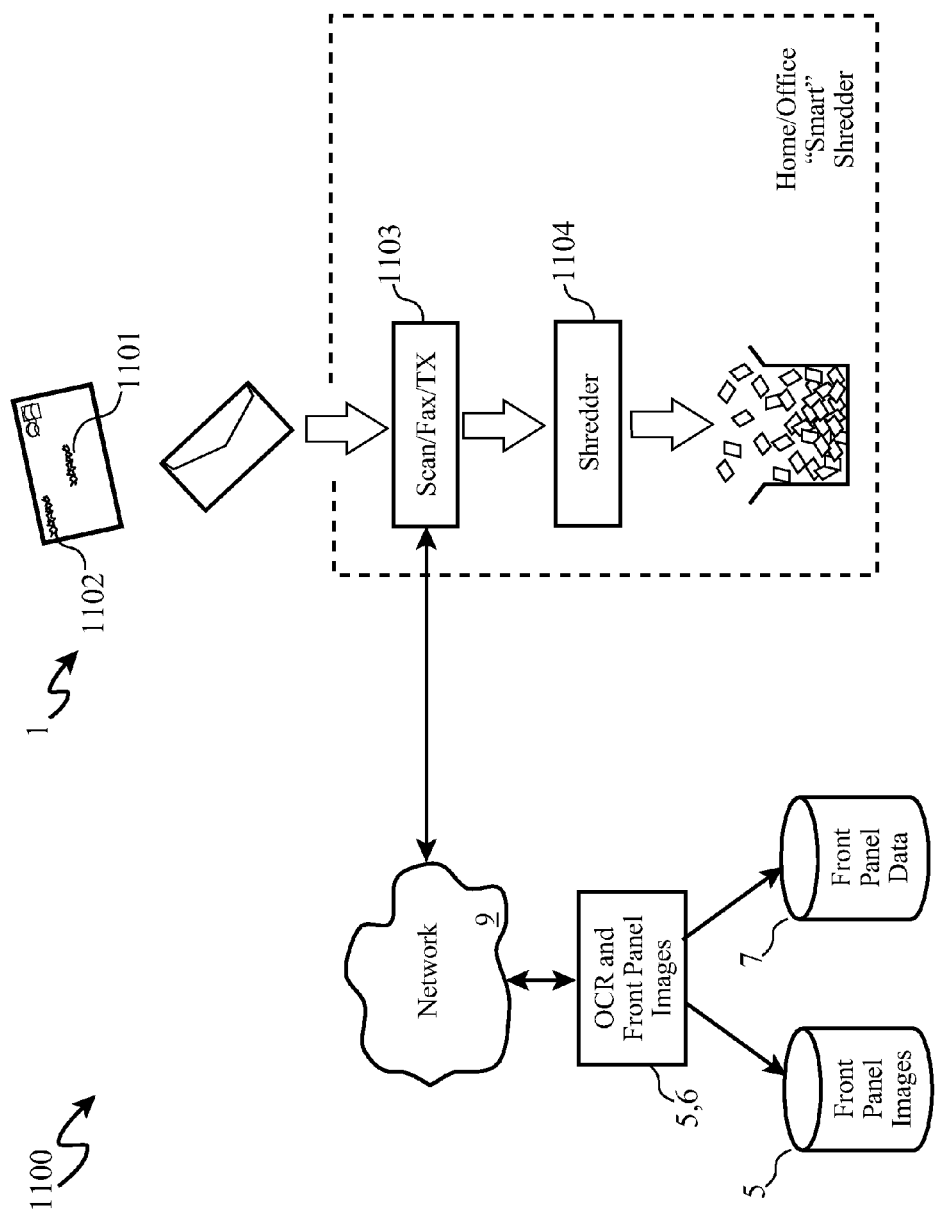

In yet another embodiment (1100) of the invention as shown in FIG. 10, on-site preprocessing of the unwanted mail may be provided through a combination scanner/imaging and shredding system. In this system, located at the addressee's site, the recipient determines which mail is unwanted (1) after opening and reading it, or in an unopened state. The recipient then feeds this unwanted mail into a slot or bin of the preprocessor (1100), which routes the mail through a scanner (1103) to extract an image of the sender's information (1102) and the recipient's information (1101). The piece of mail continues physically, such as through gravity feed or friction feed, into a shredder stage (1104), which destroys the physical mail, dropping or depositing the shredded mail (1106) into a collection basket.

Simultaneously, or periodically, the scanner stage (1103) connects to the server or to the OCR/Front Panel Images portions of the aforementioned system arrangements, and transmits images of the mail which was received into the preprocessor (1100). Transmission may be made using facsimile via a Plain Old Telephone System ("POTS"), or though a data connection such as a modem via POTS, or via an Internet, LAN, Cable modem, wireless, or other data connection.

When the images are received, they can be optically processed to recognize the recipient's name and address as well as the sender's name and address, and then this information can be added to the front panel databases directly, or included in acceptance reports to the senders.

Accordingly, the aforementioned business processes may also be inclusive of revenue generation through the selling or leasing of the preprocessors, through charging for the reporting service, or both.

Suitable Computing Platform

In one embodiment of the invention, the functionality of the system, including the previously described logical processes, are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device.

Therefore, it is useful to review a generalized architecture of a computing platform which may span the range of implementation, from a high-end web or enterprise server platform, to a personal computer, to a portable PDA or web-enabled wireless phone.

Figure 2A:
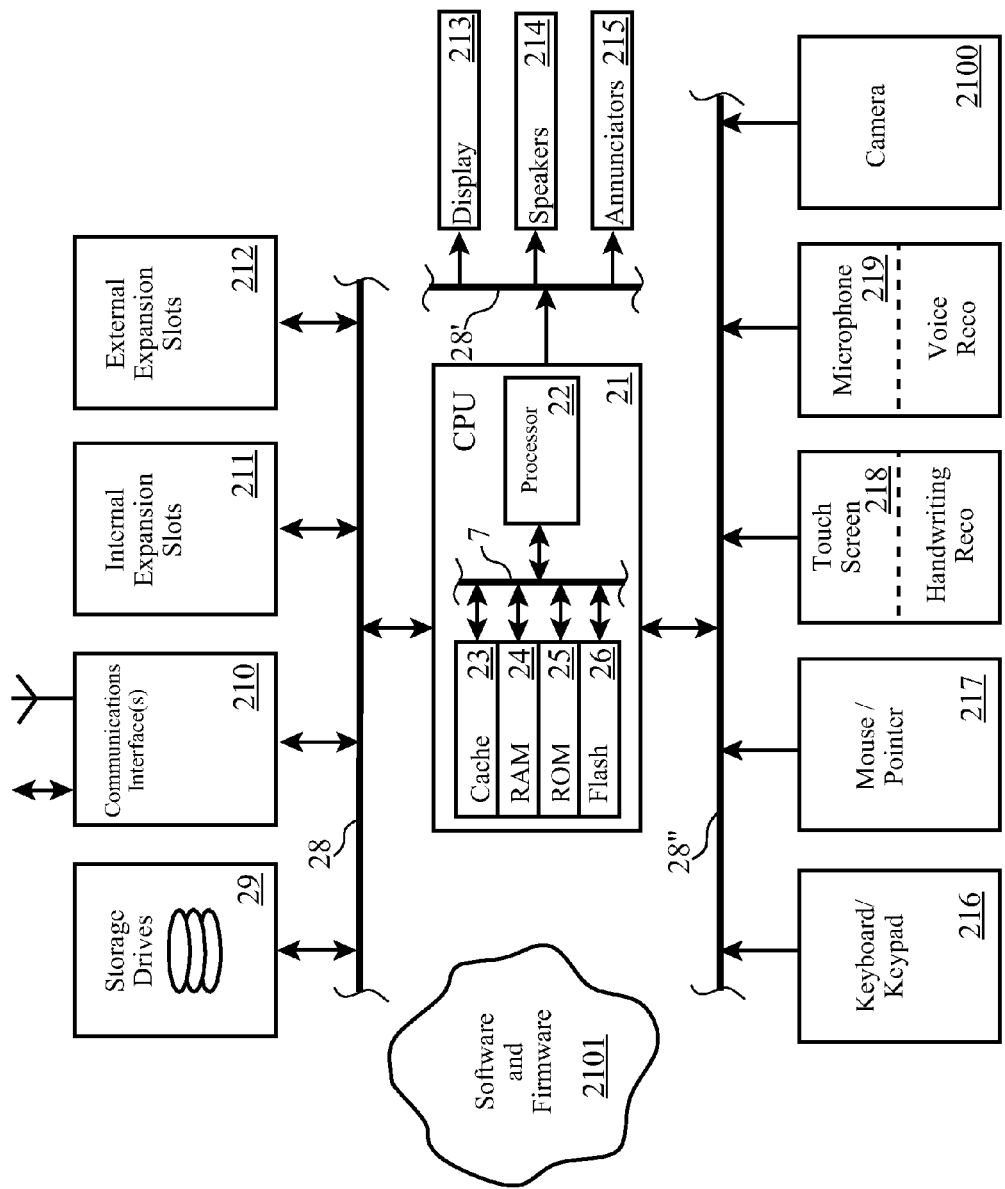
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Tomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
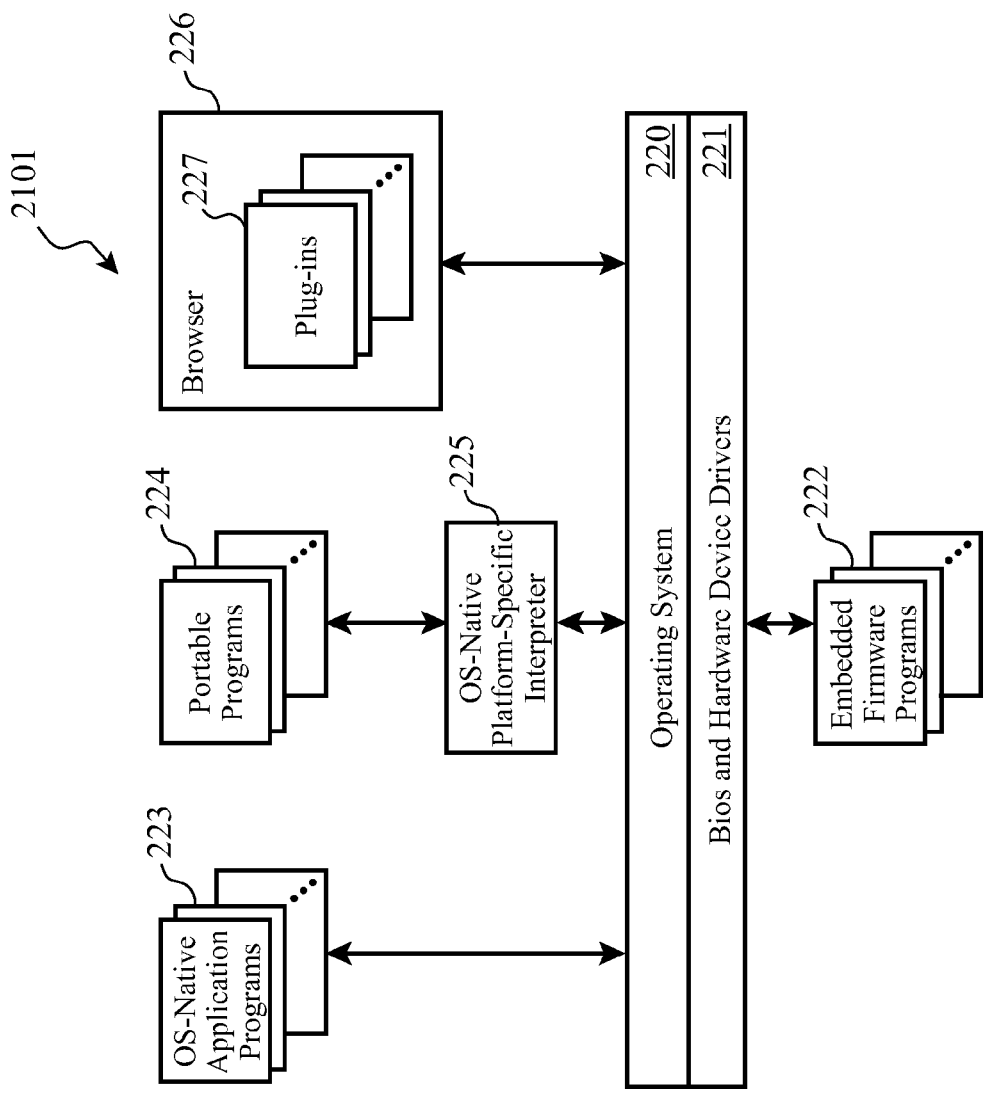

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.
Service-based Embodiments Alternative embodiments of the present invention include some or all of the foregoing logical processes and functions of the invention being provided by configuring software, deploying software, downloading software, distributing software, or remotely serving clients in an on demand environment.

Software Deployment Embodiment. According to one embodiment of the invention, the methods and processes of the invention are distributed or deployed as a service by a service provider to a client's computing system(s).

Figure 3A:
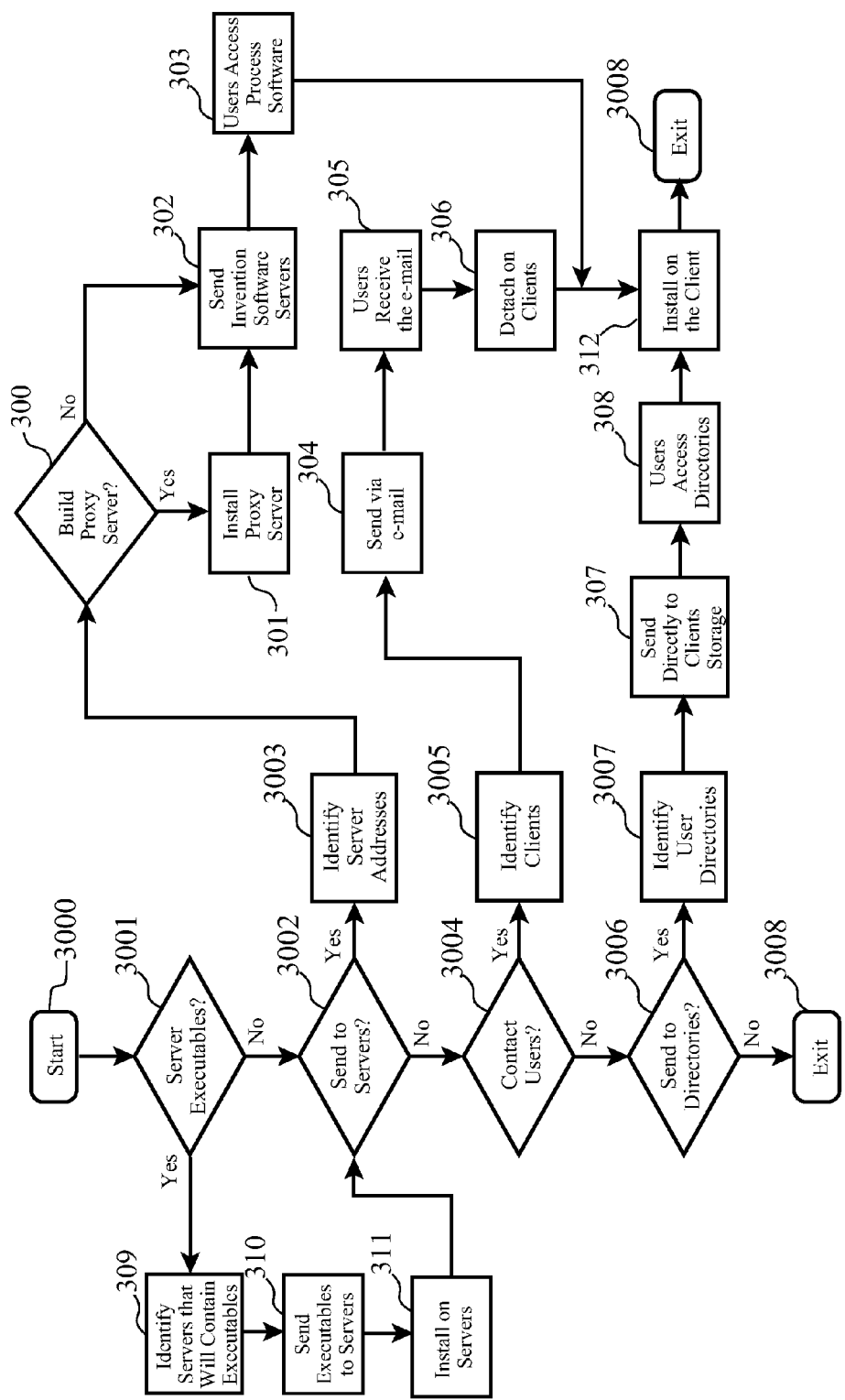
FIG. 3a sets forth a logical process to deploy software to a client in which the deployed software embodies the methods and processes of the present invention.

Turning to FIG. 3a, the deployment process begins (3000) by determining (3001) if there are any programs that will reside on a server or servers when the process software is executed. If this is the case, then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers, then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
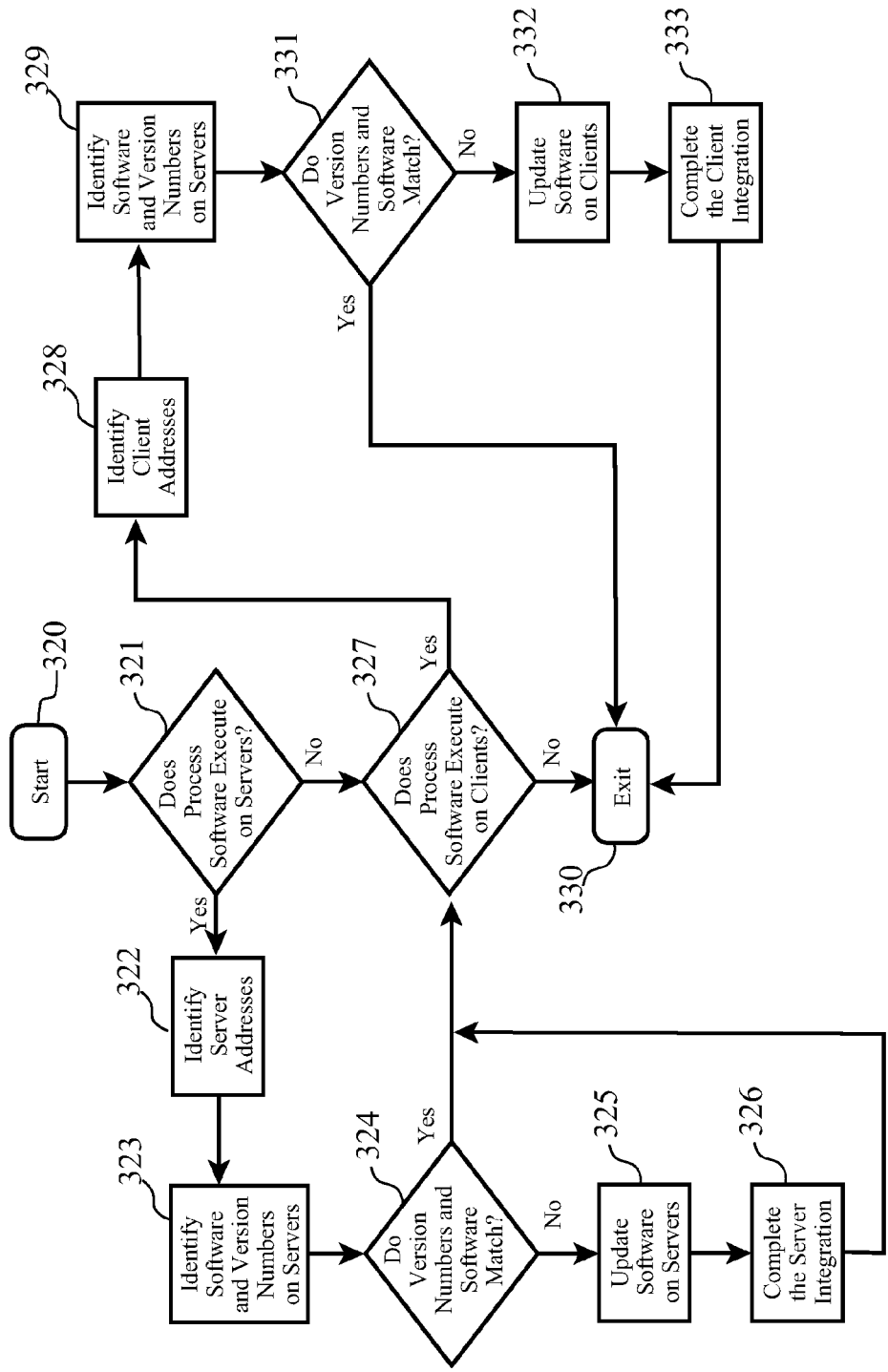
FIG. 3b sets for a logical process to integrate software to other software programs in which the integrated software embodies the methods and processes of the present invention.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match and there is no missing required software the integration continues in (327).

If one or more of the version numbers do not match, then the unmatched versions are updated on the server or servers with the correct versions (325). Additionally, if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients, the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment. In another embodiment, the invention may be realized as a service or functionality available to other systems and devices via an Application Programming Interface ("API"). One such embodiment is to provide the service to a client system from a server system as a web service.

On-Demand Computing Services Embodiment. According to another aspect of the present invention, the processes and methods disclosed herein are provided through an on demand computing architecture to render service to a client by a service provider.

Figure 3C:
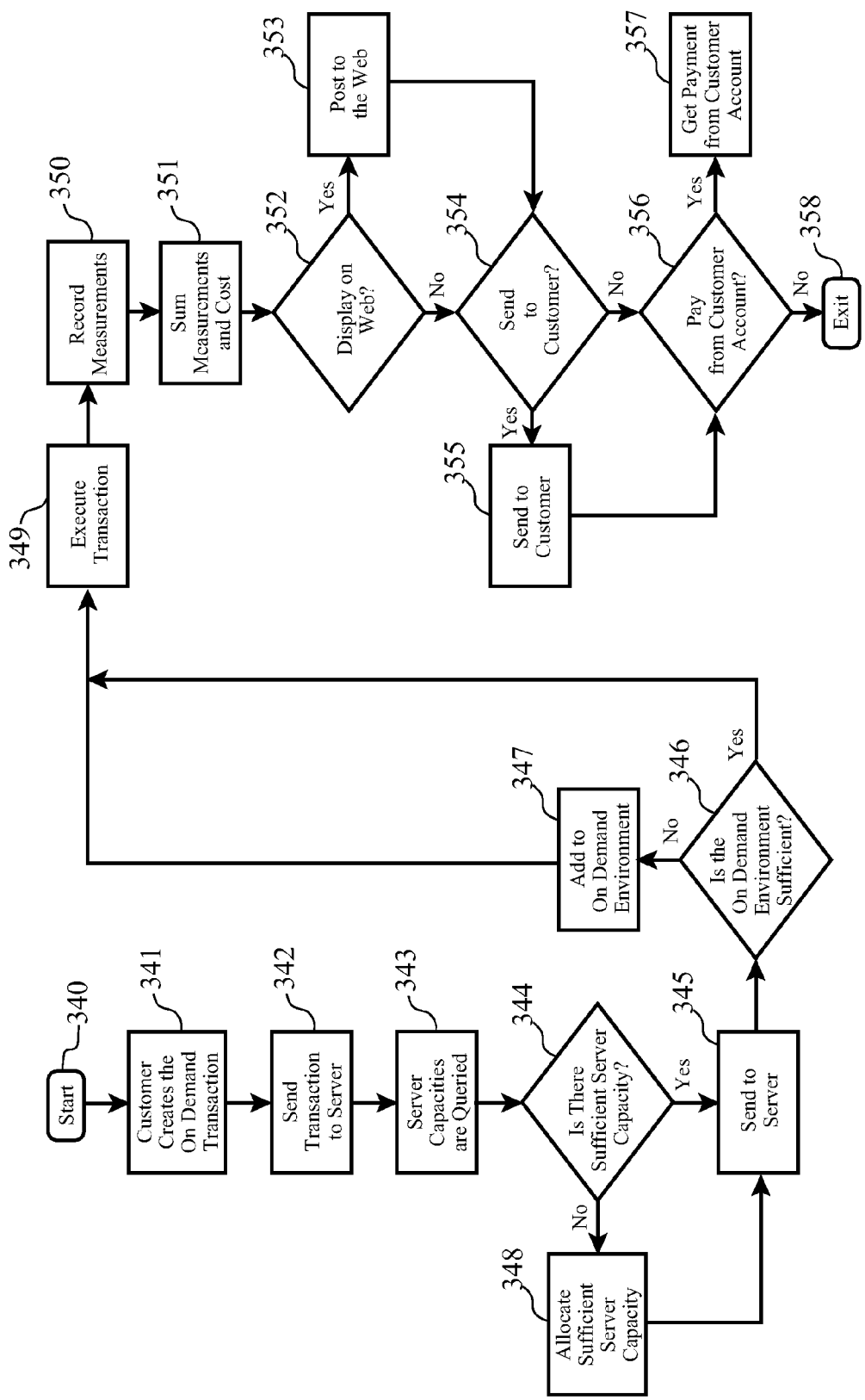
FIG. 3c sets for a logical process to execute software on behalf of a client in an on-demand computing system, in which the executed software embodies the methods and processes of the present invention.

Turning to FIG. 3c, generally speaking, the process software embodying the methods disclosed herein is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On-Demand environment the main server can initially be the only server, then as capacity is consumed other servers are added to the On-Demand environment.

The server central processing unit ("CPU") capacities in the On-Demand environment are queried (343). The CPU requirement of the transaction is estimated, then the servers available CPU capacity in the On-Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On-Demand environment to determine if the environment has sufficient available capacity for processing the transaction. This environment capacity consists of such things as, but not limited to, network bandwidth, processor memory, storage etc. (345). If there is not sufficient available capacity, then capacity will be added to the On-Demand environment (347). Next, the required software to process the transaction is accessed, loaded into memory, then the transaction is executed (349).

The usage measurements are recorded (350). The usage measurements consists of the portions of those functions in the On-Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On-Demand costs be posted to a web site (352), then they are posted (353). If the customer has requested that the On-Demand costs be sent via e-mail to a customer address (354), then they are sent (355). If the customer has requested that the On-Demand costs be paid directly from a customer account (356), then payment is received directly from the customer account (357). The last step is to exit the On-Demand process.

Grid or Parallel Processing Embodiment. According to another embodiment of the present invention, multiple computers are used to simultaneously process individual audio tracks, individual audio snippets, or a combination of both, to yield output with less delay. Such a parallel computing approach may be realized using multiple discrete systems (e.g. a plurality of servers, clients, or both), or may be realized as an internal multiprocessing task (e.g. a single system with parallel processing capabilities).

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
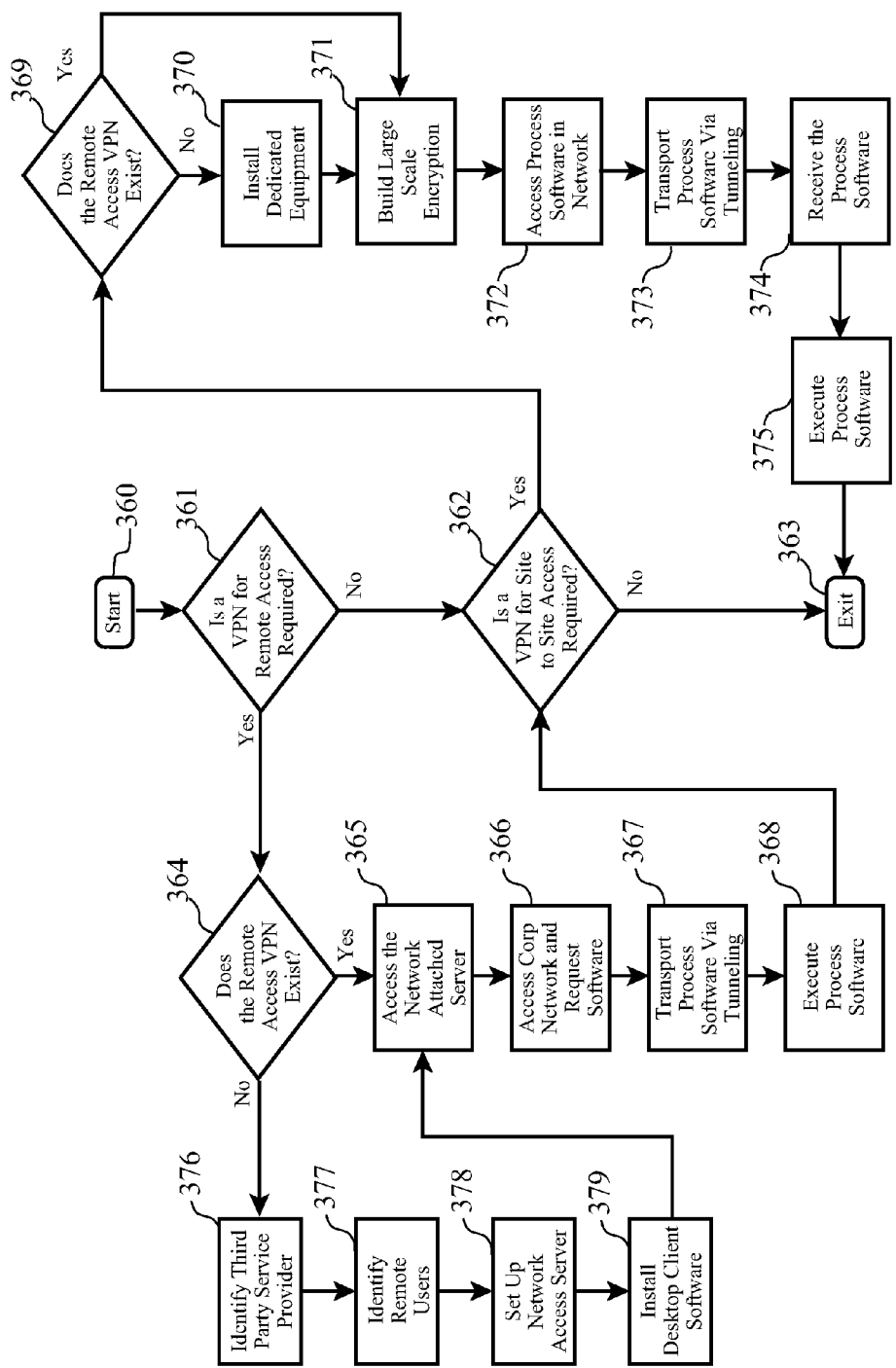
FIG. 3d sets for a logical process to deploy software to a client via a virtual private network, in which the deployed software embodies the methods and processes of the present invention.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then, build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
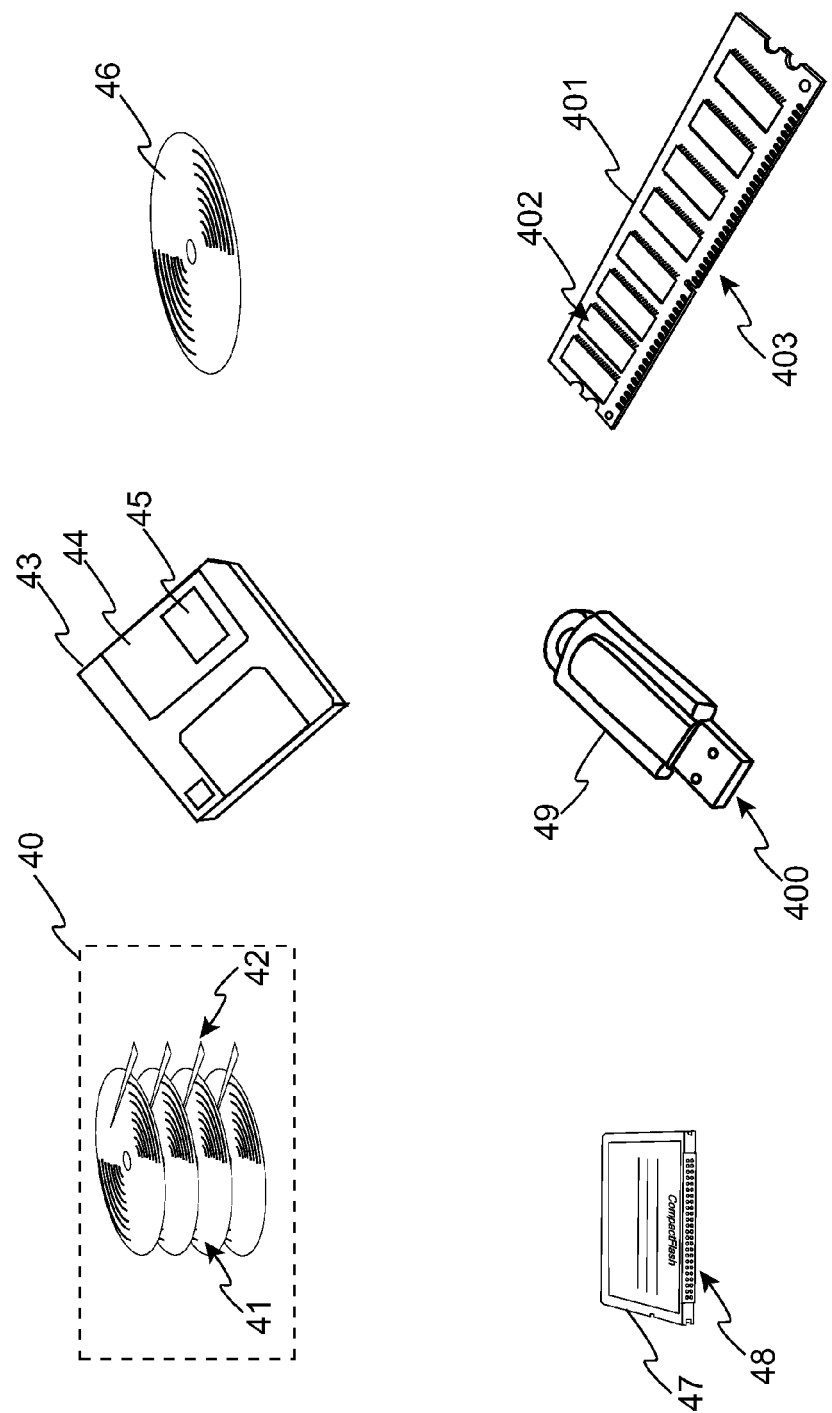

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
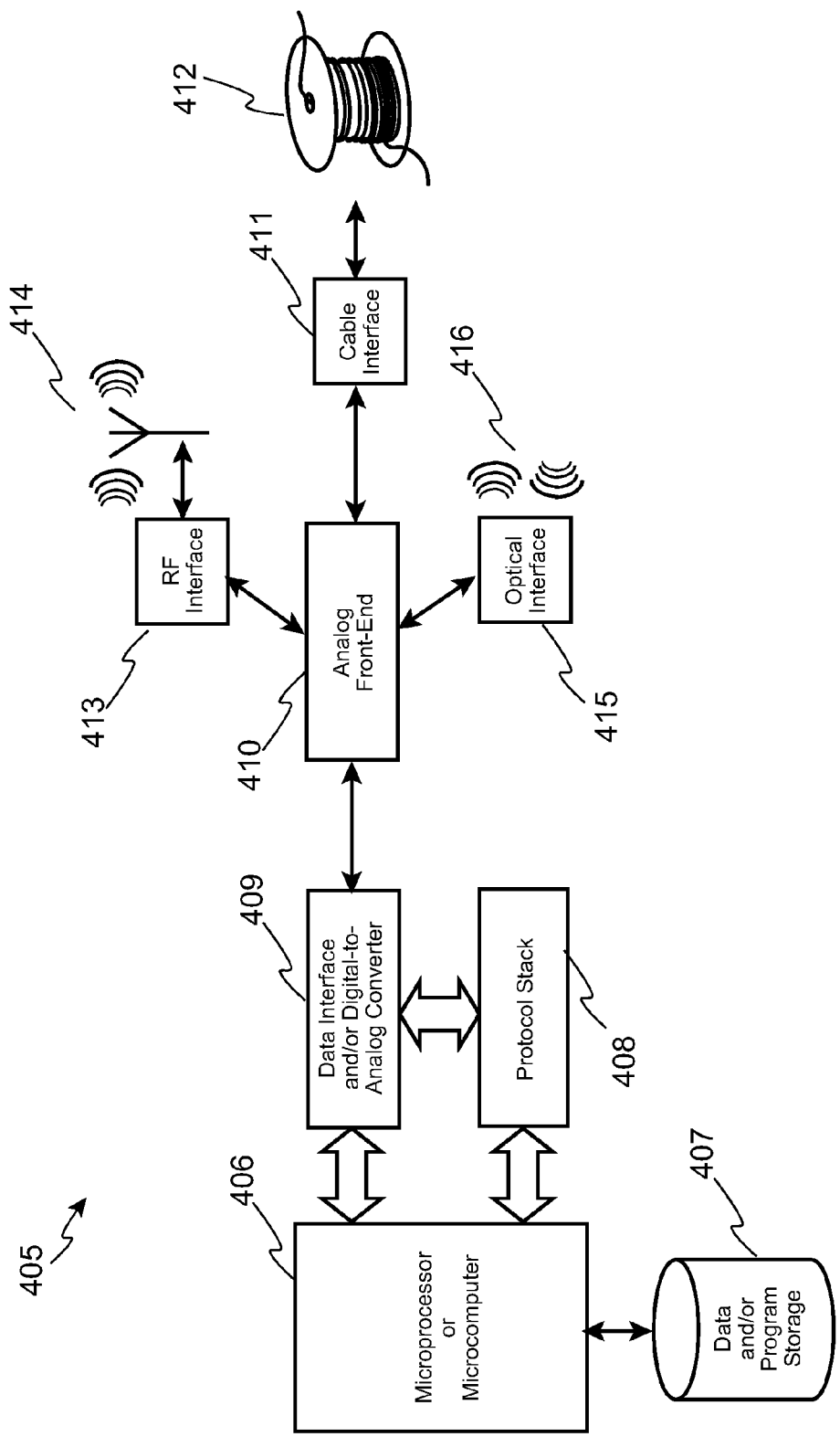

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-periperal embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as an RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

Conclusion

While certain examples and details of a preferred embodiment have been disclosed, it will be recognized by those skilled in the are that variations in implementation such as use of different programming methodologies, computing platforms, and processing technologies, may be adopted without departing from the spirit and scope of the present invention. Therefore, the scope of the invention should be determined by the following claims.

What is claimed is:

1. A system for handling unwanted physical mail pieces and preventing future delivery of similar mail comprising:
   a discard collection bin which:
      receives one or more pieces of physical mail discarded by a recipient of the physical mail, the recipient being indicated as an addressee of the physical mail,
      routes the received piece of physical mail through a scanner to produce an electronic image of the front panel of each piece of discarded physical mail, and immediately subsequent to the producing of an image and without requiring a command from a user, shreds the received piece of physical mail into a collection basket;

an optical recognizer device which receives the front panel image from the discard collection bin, determines from the front panel image a sender identification and a recipient identification; and a server computer which receives the sender and recipient identifications from the optical recognizer and electronically notifies the sender of discarded mail to discontinue any mailings to the recipient, wherein the notification requires no command from the user.

2. The system as set forth in claim 1 wherein the optical recognizer is co-located with the discard collection bin.

3. An automated method for handling unwanted physical mail pieces and preventing future delivery of similar mail comprising:

receiving by a discard collection bin one or more pieces of physical mail discarded by a recipient of the physical mail, the recipient being indicated as an addressee of the physical mail;

routing by the discard collection bin the received piece of physical mail through a scanner to produce an electronic image of a front panel of each piece of discarded physical mail;

immediately subsequent to the producing of an image and without requiring a command from a user, shredding by the discard collection bin the received piece of physical mail into a collection basket;

receiving by an optical recognizer device the front panel image from the collection bin;

determining by the optical recognizer a sender identification and a recipient identification from the front panel image;

receiving by a server computer the identifications from the optical recognizer; and electronically notifying by the server computer the sender of discarded mail to discontinue mailings to the recipient, wherein the notifying requires no command from the user.

4. The method as set forth in claim 3 wherein the optical recognizer is co-located with the discard collection bin.

5. A computer program product for handling unwanted physical mail pieces and preventing future delivery of similar mail, wherein the computer program product comprises a computer readable memory having computer usable program code executable by a processor, comprising:

first computer usable program code to, subsequent to receiving into a discard collection bin one or more pieces of physical mail discarded by a recipient of the physical mail, produce an electronic image of a front panel of each piece of received physical mail, the recipient being an addressee as indicated on the front panel;

second computer usable program code to receive the front panel images from the discard collection bin, and to determine a sender identification of each piece of received piece of mail; and third computer usable program code to receive by a server computer the sender identifications from the optical recognizer, and to electronically notify the sender to discontinue any mailings to the recipient, wherein the notifying requires no command from the user;

wherein the first, second and third computer usable program code are stored by the computer readable memory.

6. The computer program product as set forth in claim 5 further comprising fourth computer usable program code stored by the one or more computer readable memories to aggregate acceptance information, rejection information, or both, and to produce a report regarding the information.

* * * * *